United States Patent [19]

King

[11] Patent Number: 4,461,576
[45] Date of Patent: Jul. 24, 1984

[54] OPTICAL MEASURING SYSTEM

[75] Inventor: Charles King, Elmira, N.Y.

[73] Assignee: Courser Incorporated, Elmira, N.Y.

[21] Appl. No.: 235,400

[22] Filed: Feb. 18, 1981

[51] Int. Cl.³ .................................................. G01B 11/04
[52] U.S. Cl. ..................................... 356/375; 356/387; 250/560; 250/577
[58] Field of Search ............... 356/375, 376, 384, 385, 356/386, 387; 340/612, 617, 619; 358/375, 376, 384, 385, 386, 387; 250/560, 571, 577

[56] References Cited

U.S. PATENT DOCUMENTS

| | | | |
|---|---|---|---|
| 1,706,857 | 3/1929 | Mathe | 356/372 |
| 3,625,618 | 12/1971 | Bickel | 356/376 |
| 3,741,656 | 6/1973 | Shapiro | 250/577 |
| 3,744,915 | 7/1973 | Sick | 356/386 |
| 3,905,705 | 9/1975 | Petrahilos | 356/387 |
| 4,201,476 | 5/1980 | Musto et al. | 356/386 |
| 4,245,517 | 1/1981 | Barker et al. | 356/386 |

FOREIGN PATENT DOCUMENTS

44-25760  10/1969  Japan ................................. 250/577

*Primary Examiner*—R. A. Rosenberger
*Attorney, Agent, or Firm*—Jones, Tullar & Cooper

[57] ABSTRACT

An optical gauge having a laser or other such light source, the beam from which is cyclically directed upon a photo-detector by a rotating plane mirror, the time at which or during which in each revolution of the plane mirror the beam impinges upon the photo-detector being commensurate with a linear parameter of a workpiece upon which the beam is also directed, either constantly, as in the first disclosed embodiment, or cyclically as the beam is moved across the workpiece and occluded thereby during a portion of each rotation of the mirror, as in the second disclosed embodiment. The point on the rotating mirror at which the beam is reflected lies at the focal point of a fixed, parabolic mirror. In the first embodiment, used to monitor the surface level of a process liquid, such as molten glass, the beam is directed at an angle upon the surface of the liquid by which it is reflected to a single parabolic mirror and thence to the rotating plane mirror by which it is scanned in a circular path which intersects the photo-detector in each revolution. In the second embodiment, the workpiece is positioned between a pair of parabolic mirrors arranged in coaxial, face-to-face relation. The beam is scanned diametrically across a first parabolic mirror after being reflected by the rotating plane mirror, and is thus reflected to and scanned across the second parabolic mirror except when it is occluded by the workpiece between the two parabolic mirrors. The photo-detector lies at the focal point of the second parabolic mirror and thus receives light at all times that the beam is scanned across the parabolic mirrors except when occluded by the workpiece. Thus, the time during which the beam is occluded during each scan is a function of the position or dimension of the workpiece by which it is occluded.

23 Claims, 11 Drawing Figures

OPTICAL MEASURING SYSTEM

BACKGROUND OF THE INVENTION

The present invention relates to optical measuring devices, and more specifically to gauges utilizing a scanned light beam to measure a linear dimension of a workpiece, or the linear distance from a reference point to a point on the workpiece upon which the beam is directed.

Optical gauges are employed in many applications, among which are those where mechanical contact is undesirable or impossible, and those where optical measurement is more rapid and/or reliable than mechanical. For example, in processing molten glass and continuous casting of metals it is necessary to maintain the surface level of the material between desired limits as the process continues. Optical gauges wherein only a light beam contacts the process material are the natural choice for such applications. Lasers provide a desirable light source for optical gauges of this type since they emit a concentrated beam of coherent radiation at a wavelength selected for best performance in the particular environment in which the gauge is to be employed.

The principal object of the invention, in a general sense, is to provide novel and improved apparatus for measuring a linear dimension with superior accuracy and reliability without physical contact with the object or material being measured.

Another object is to provide a gauge which continuously monitors the vertical level of molten materials or other process liquids and which may be installed and calibrated without shutting down the process.

A further object is to provide optical measuring apparatus of improved accuracy and reliability for making continuous and rapid measure—of the height, width, thickness, diameter, etc. of a workpiece.

Still another object is to provide optical apparatus for measuring linear distances wherein an electronically measured time period is directly commensurate with the dimension being measured.

SUMMARY OF THE INVENTION

In accordance with the foregoing objects, the invention contemplates an optical measuring device employing a laser light source, a stationary parabolic mirror, a rotating plane mirror, a photo-detector and an electronics package for establishing a time period in response to actuation of the photo-detector & converting the time period to the desired measurement, with which it is directly commensurate. Between the laser and the photodetector the beam may strike the parabolic and plane mirrors and the object or material being measured in any desired order, but in any event the axis of rotation of the plane mirror intersects the optical axis of the parabolic mirror at the latter's focal point.

The rotating mirror is carried on the output shaft of a synchronous motor which also carries an opaque disc having a slot or cut-out area therein. A light source and a photo-diode are fixedly positioned on opposite sides of the disc so that the cut-out portion of the disc passes therebetween during a fixed portion of each revolution of the motor. Although they may be the same type of element (neither necessarily being a photo-diode), for purposes of clarity and distinction, the photo-sensitive device upon which the laser beam ultimately impinges will be referred to herein as "photo-detector" and the device which is activated by the fixed light source and which is located on the opposite side of the opaque disc as a "photo-diode". In the first disclosed embodiment of the invention the laser beam is reflected from the surface of the workpiece and in the second disclosed embodiment of the beam is occluded by the workpiece during a portion of each revolution of the mirror. The photo-diode is used simply to provide a signal for initiating each cycle while the time period commensurate with the measured dimension is the period between two activations (or deactivations) of the photo-detector which occur during each scan due to the position of the workpiece, as will later become apparent.

In the first embodiment, the invention is disclosed in a configuration as employed to measure the surface level of molten glass relative to a reference plane. A laser source is positioned to project a beam at a known angle upon the surface of the glass for reflection thereby to a parabolic mirror. As the surface level varies, the beam will strike the parabolic mirror at different points along a radial path thereon. From the parabolic mirror the beam is reflected to a point on the rotational axis of a rotating plane mirror (at the focal point of the parabolic mirror) and thence in a moving path which intersects the photo-detector during a portion of its travel. As the position of the beam upon the parabolic mirror varies with variations in the surface level of the glass, the angular position of the plane mirror at the time the beam intersects the photo-detector varies. Thus, the time between activation of the photodiode and of the photo-detector varies, providing a direct indication of the distance between actual surface level and a predetermined norm, or reference surface. In this configuration, the laser is mounted on one side of the work and the optics (mirrors, lenses and filters) and detector unit are in a separate housing on the other side.

In the second example, the elements are shown in a configuration as employed to measure the outside diameter of a workpiece. The laser beam is projected along a first axis from which it is reflected at 90° by a fixed plane mirror to the rotating mirror which scans the beam diametrically across the parabolic mirror; the laser, fixed and rotating plane mirrors and parabolic mirror are all housed in a common enclosure on one side of the workpiece.

Since the axis of rotation of the rotating mirror perpendicularly intersects the optical axis of the parabolic mirror at its focal point, as previously mentioned, the scanned beam reflected by the parabolic mirror moves linearly in a direction perpendicular to its axis. In this configuration a second fixed, parabolic mirror is employed, positioned in a separate housing, facing the first parabolic mirror and coaxial therewith. The beam reflected from the first parabolic mirror is thus scanned diametrically across the second parabolic mirror and reflected thereby to the photo-detector, positioned at its focal point. The object being measured is placed in the path of the scanned beam between the two parabolic mirrors and occludes the beam during a portion of its scan. Thus, the beam impinges on the photo-detector both immediately before and immediately after being blocked by the work, the time period during which the beam is blocked being a direct indication of the object's outside diameter (or width). The arrangement of the optical elements employed provides measurements free from possible errors due to misalignment of the workpiece with the gauge and other factors present in gauges in which the beam is reflected directly from a scanning mirror to a photo-detector.

BRIEF DESCRIPTION OF THE DRAWINGS

FIG. 5 is a diagrammatic illustration of certain geometric relationships involved in the invention;

FIG. 6 is a timing diagram, i.e., a graphical illustration of ceratin electrical signals with respect to time, as employed in the measurement system of the embodiment of the invention shown in FIGS. 1–5a;

DETAILED DESCRIPTION

Figure 1:
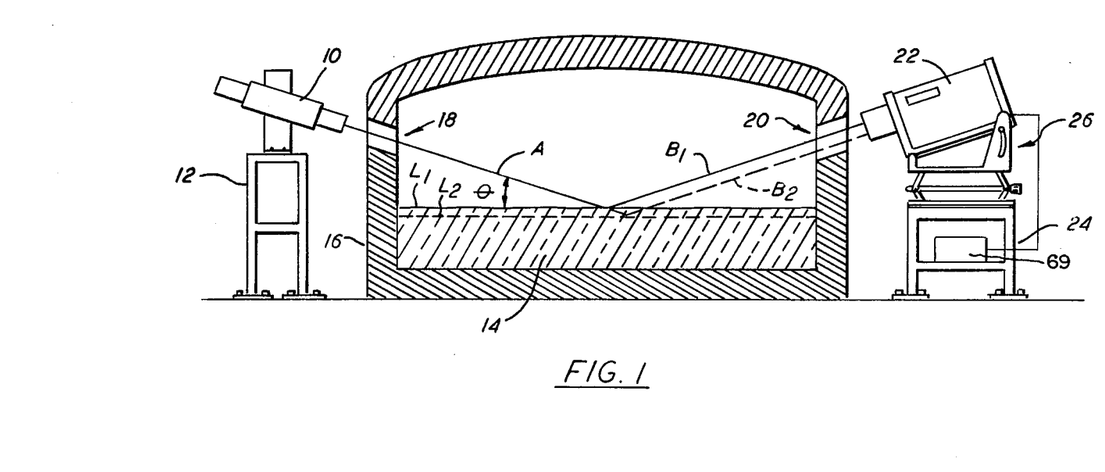
FIG. 1 is a diagrammatic illustration of the first embodiment of the invention, shown in use in a typical application.

Referring now to the drawings, in FIG. 1 is shown a light source, preferably a laser, indicated diagrammatically at 10, mounted in a suitable housing on support structure 12 to direct a beam of light along axis A. In the illustrated application, the gauging apparatus of the invention is used to monitor the level of a process material 14, such as molten glass within a refractory chamber 16. Axis A passes through opening 18 in a wall of chamber 16 and the beam strikes the surface of material 14 at a predetermined angle $\theta$. Preferably, means (not shown) are provided on support structure 12 for adjustably positioning light source 10 to establish the angle of incidence of the beam upon the material surface at the desired value.

Figure 2:
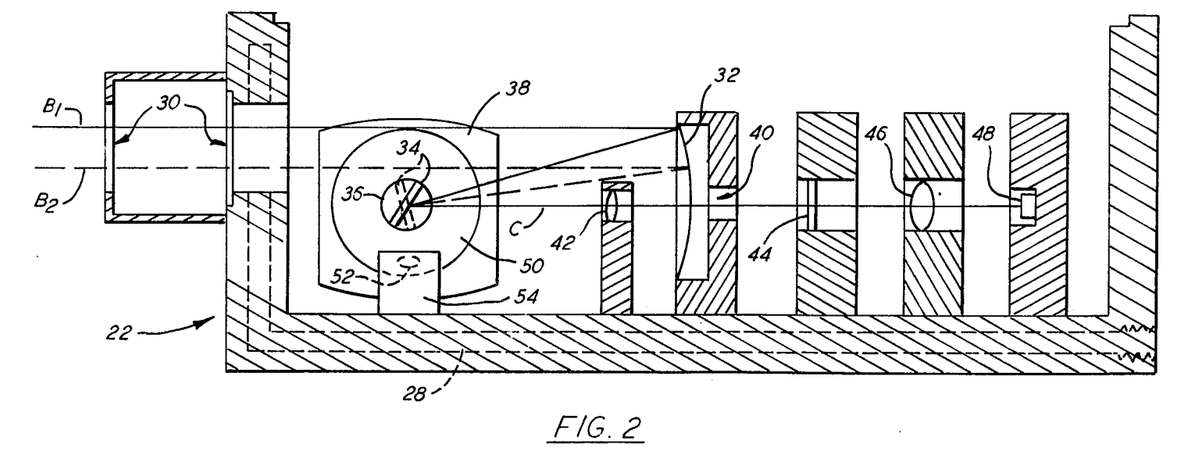
FIG. 2 is a side elevation view, in section, of a portion of the apparatus shown in FIG. 1.
Figure 3:
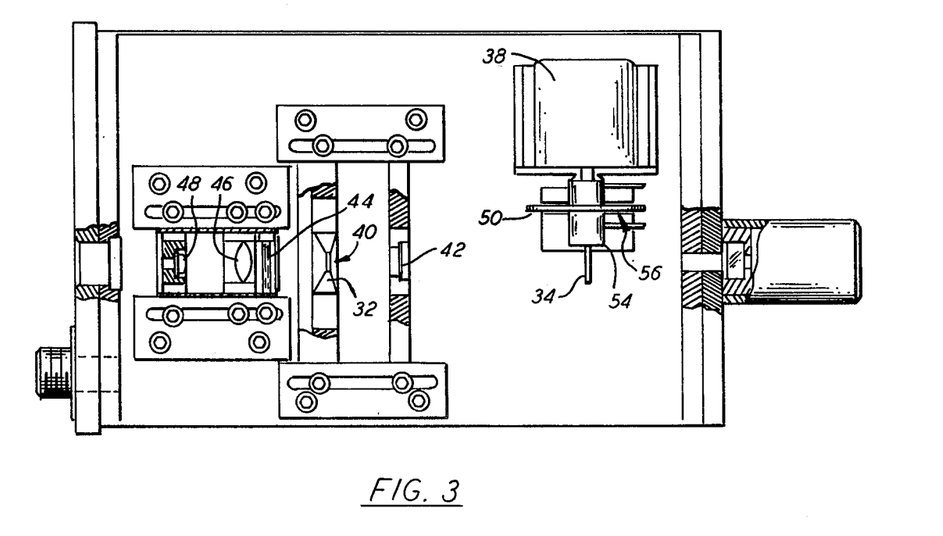
FIG. 3 is a plan view of the apparatus of FIG. 2.

After reflection by the surface of material 14 the beam is directed along a second axis having a position dependent upon the vertical level of the material surface. When the surface is at the first level, indicated in solid line at $L_1$, the axis of the reflected beam is at $B_1$. When the level is as indicated by dashed line $L_2$ the reflected beam axis is positioned at $B_2$. The reflected beam passes through opening 20 in a second wall of chamber 16 and is received by a detector unit indicated generally at 22, enclosed by a second housing positioned on support structure 24 which is affixed to the underlying surface and may include mechanism 26 for adjustably positioning unit 22. Detector unit 22 is mounted with its major axis parallel with the axis of the reflected beam; that is, unit 22 is mounted with its axis at the same angle to the process material surface as the axis of light source 10. Since the system may be employed in applications where very high temperatures are common, water jackets or other such cooling means are preferably provided for detector unit 22 as well as light source 10. A passage way for cooling water in the housing of detector 22 is indicated in FIG. 2 at 28.

Unit 22 includes an entrance aperture 30, elongated in the direction in which the beam axis is displaced as the level of the process material varies. Within the housing of unit 22, the beam is directed upon fixed parabolic mirror 32 and reflected thereby to plane mirror 34 which is mounted on output shaft 36 of synchronous electric motor 38. A critical feature of the arrangement of the elements is the positioning of the axis of rotation of motor 38 in the plane of the reflecting surface of mirror 34 and at the focal point of mirror 32. That is, the beam is focused by parabolic mirror 32 upon the surface of plane mirror 34 at the axis of rotation thereof. The axis of the beam after reflection by mirror 34 is scanned in an arcuate path about the axis of rotation of the mirror over that portion of its travel during each revolution when the beam strikes the mirror's reflective surface.

Mirror 32 and its supporting structure are provided with a central aperture 40, the axis C of which is the optical axis of mirror 32 and is parallel to the axis ($B_1$, $B_2$) of the beam entering unit 22. Additional elements positioned along axis C include an optional double convex lens 42, filter 44, condensing lens 46 and photo-detector 48. At some point in each revolution of mirror 34 the scanned beam will be directed along axis C to impinge upon photo-detector 48. The angular position of mirror 34 at which this occurs is dependent upon the point at which the beam strikes mirror 32. For example, when the beam is positioned at axis $B_1$, the reflection of the beam from mirror 34 will be directed along axis C when mirror 34 is at the rotational position indicated in FIG. 2 in solid lines; when the beam is positioned at axis $B_2$, the reflection along axis C will occur when mirror 34 is at the rotational position indicated in dotted lines. The positions of mirror 34 shown in FIG. 2 are, of course, for comparative purposes only and not intended to be geometrically accurate.

Figure 4:
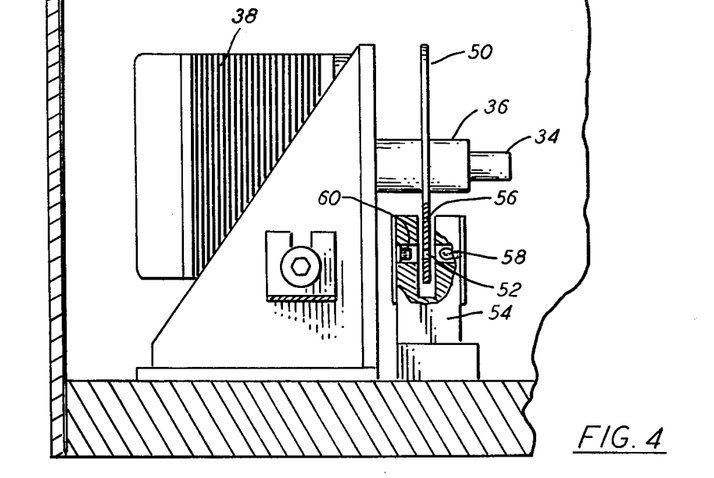
FIG. 4 is a fragmentary, rear elevational view of a portion of the apparatus, taken on line 3—3 of FIG. 3.

Output shaft 36 of motor 38, in addition to mirror 34, also carries opaque disc 50 having a cut-out area or opening 52 in a portion thereof. Mounting block 54 includes an open slot 56 (FIG. 4) through which the portion of disc 50 wherein opening 52 is located travels as the disc rotates. Light source 58, such as a light-emitting diode, and photo-diode 60 are supported in mounting block 54 on opposite sides of slot 56 at a position which is passed by opening 52 as disc 50 rotates. Thus, opaque disc 50 blocks the passage of light from source 58 to photo-diode 60 except at the time opening 52 is positioned between the two. The electrical signal generated by photo-diode 60 during the time opening 52 is aligned therewith provides a reference or index period in each revolution of motor 38 which may operate, for example, at 3,600 rpm. The time period which elapses between activation of photo-diode 60 as the leading edge of opening 52 passes light source 58, and activation of photo-detector 48, which occurs at a point in the revolution dependent upon the position of the beam axis entering detector unit 22, is thus directly related to the surface level of the process material by which the beam is reflected. The elements are so constructed and arranged that the beam reflected from mirror 34 strikes photo-detector 48 during the index period, while opening 52 is positioned between light source 58 and photo-diode 60, as explained later in more detail. The time period may be measured electronically and converted to the desired measurement of surface level, as described in the following paragraphs.

Figures 5, 5A:
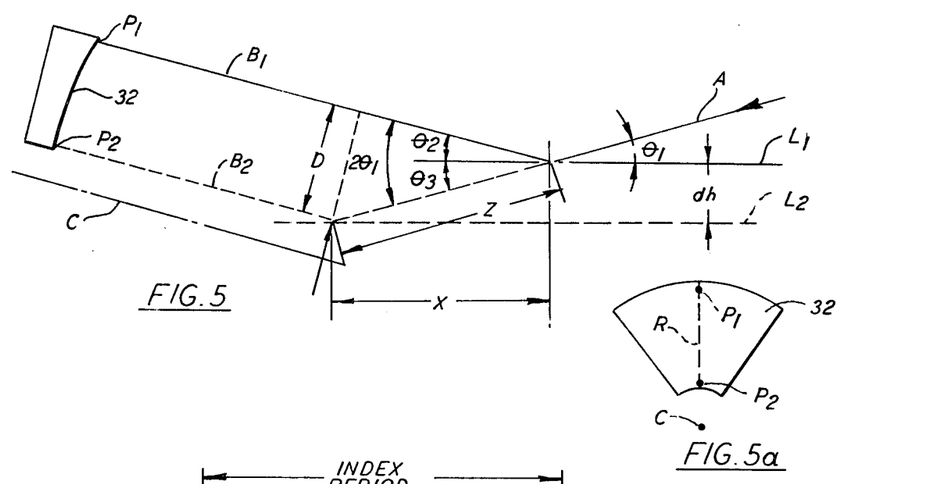
FIG. 5 is a fragmentary, front elevation view taken on the line 5—5 of FIG. 3.
FIG. 5a is a front elevation view of one of the elements.

FIG. 5 illustrates the geometric relationships of the beam and process material surface at the maximum and minimum surface levels which the gauge is designed to monitor. The beam is directed from the light source along axis A, at angle $\theta_1$ to the horizontal material surface. Since the material surface remains in a horizontal plane as it rises or falls, the angle $\theta_1$ of incidence of the beam upon the surface is always the same regardless of surface level. Since the angle of reflectance equals the angle of incidence, $\theta_2 = \theta_1$, and, by intersection, $\theta_3 = \theta_1$. Therefore, the angle between the extension of axis A and axis $B_1$ ($\theta_2 + \theta_3$) may be expressed as $2\theta_1$. The length of axis A between the points at which it strikes the material surface at levels L, and $L_2$ is denoted "Z" and the distance between axes $B_1$ and $B_2$ is denoted "D". Thus, for any given angle of incidence of the beam upon the material surface, the usable range of the system (dh) may be calculated. Of course, the dimension D, which is a function of the size of the parabolic mirror used, must be known. Also, the straight-line horizontal distance between the points at which axis A strikes the process material surface at the upper and lower limits, denoted "X", may be determined. That is, with D and $\theta_1$ known:

$Z = D/\text{Sin } 2\theta_1$ $dh = Z \text{ Sin } \theta_1 = \text{Sin } \theta_1 (D/\text{Sin } 2\theta_1)$ $X = Z \text{ Cos } \theta_1 = \text{Cos } \theta_1 (D/\text{Sin } 2\theta_1)$ Thus, the dimensional parameter of component design which controls the limits within which the system will operate is the effective or usable radius of the parabolic mirror. Once the desired angle of axis A with respect to the process material surface ($\theta_1$) has been decided upon and light source 10 is arranged to direct the beam at this angle, detector unit 22 is arranged with the axis of the parabola (i.e., the central or optical axis of mirror 32), denoted "C" in FIG. 5, at the same angle to the material surface. Therefore, as axis B shifts with variations in the level of material 14, it always remains parallel to the central axis C of the parabola and at angle $\theta_1$ to the surface of material 14.

Referring briefly to FIG. 5a, it may be seen that only that portion of the surface of mirror 32 along a single radial line is actually utilized in this application of the invention. At the upper limit of surface level $L_1$, axis $B_1$ strikes the surface of mirror 32 at point $P_1$, and at the lower limit axis $B_2$ strikes the mirror at point $P_2$. The geometric center of the parabola, of course, lies within opening 40 so the dimension D is somewhat less than the actual radius of the parabola. As the surface level varies, the beam strikes mirror 32 at some point along line R, at or between points $P_1$ and $P_2$. Although the beam may actually be a spot of various size and degree of symmetry as it appears on mirror 32 it will, in any event, be focused to a fine point at the surface of mirror 34. In this application of the invention, i.e., monitoring horizontal surface levels such as liquids and molten materials, axes A, B and C lie in a common vertical plane. Only a segment of the parabola need be provided as mirror 32, as indicated in FIG. 5a, since only one radial portion of its surface is actually utilized. A full parabola, however, may be easier to align and calibrate than a small segment.

Figure 6:
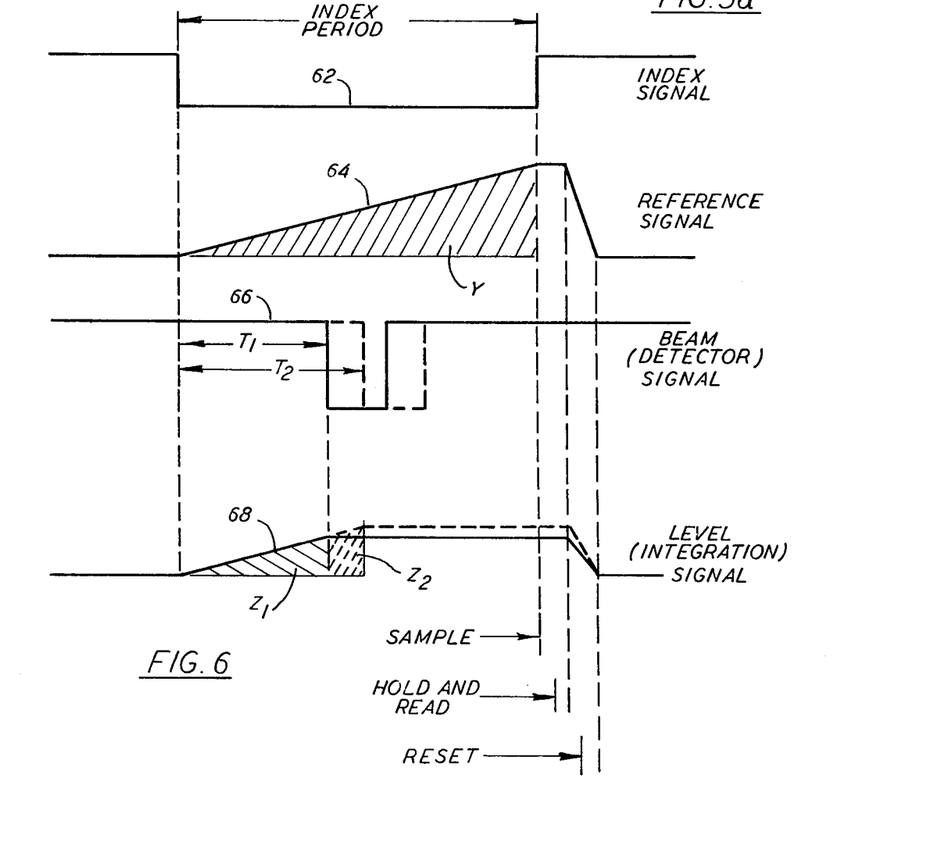

Turning now to FIG. 6, the relationship of the electrical signals to the dimensional parameter being measured or monitored may be seen more clearly. A square wave signal, indicated by trace 62, is generated by photo-diode 60 as disc 50 rotates to alternately permit light from source 58 to strike photo-diode 60 during a short portion of each revolution (e.g., about 10°) and to block light during the remainder of the time. One such square wave will thus be generated during each revolution of motor 38 and is termed, in FIG. 6, the index signal. The time period during each revolution when light strikes photo-diode 60, which in the example shown changes the signal from high to low, is termed the index period. Since the size of opening 52 and its rotational position with respect to motor 38 are fixed, the leading and trailing edges of each square wave of the index signal will vary only as a function of motor speed.

The leading edge of each index signal is used to activate a reference signal in the form of a ramp voltage, indicated by trace 64, increasing a constant rate within each index period. A square wave signal is also generated in response to the beam from source 10, reflected from the surface of material 14, mirrors 32 and 34, impinging upon photo-detector 48 at some point in each revolution depending upon the surface level of material 14. The detector or beam signal, indicated in FIG. 6 by trace 66, occurs in each cycle when the rotational position of mirror 34 is such that the beam is reflected thereby along axis C which, as previously explained, is dependent upon the position of axis B which, in turn, is dependent upon the level of the surface being monitored. In any case, the detector or beam signal always occurs within the index period.

The ramp reference signal 64 is integrated from the beginning to the end of each cycle by appropriate circuitry, producing a total integrated value represented by shaded area Y at the end of the cycle. Also, the integrated value is arrested by the leading edge of detector signal 66 and held until the end of the cycle. This is represented as a separate trace 68, termed the level signal since in this example it is commensurate with the surface level being measured. For example, when the beam is reflected from surface $L_1$ along axis $B_1$ (FIG. 5) the leading edge of detector signal 66 occurs at a time $T_1$, of the index period. The integrated value of the ramp voltage at time $T_1$ is represented by shaded area $Z_1$. When the surface level is at $L_2$ and the reflected beam axis at $B_2$, the leaading edge of the detector signal occurs at time to $T_2$ and the integrated value of the ramp voltage is represented by the sum of shaded areas $Z_1$ and $Z_2$. The value of Y will change to reflect any variations in the speed of motor 38, while the value of Z is dependent upon the vertical level of the surface being measured. The trailing edge of index signal 62 is used to trigger appropriate control circuitry to read the values of Y and Z, and to reset the reference signal for the next cycle.

Figure 7:
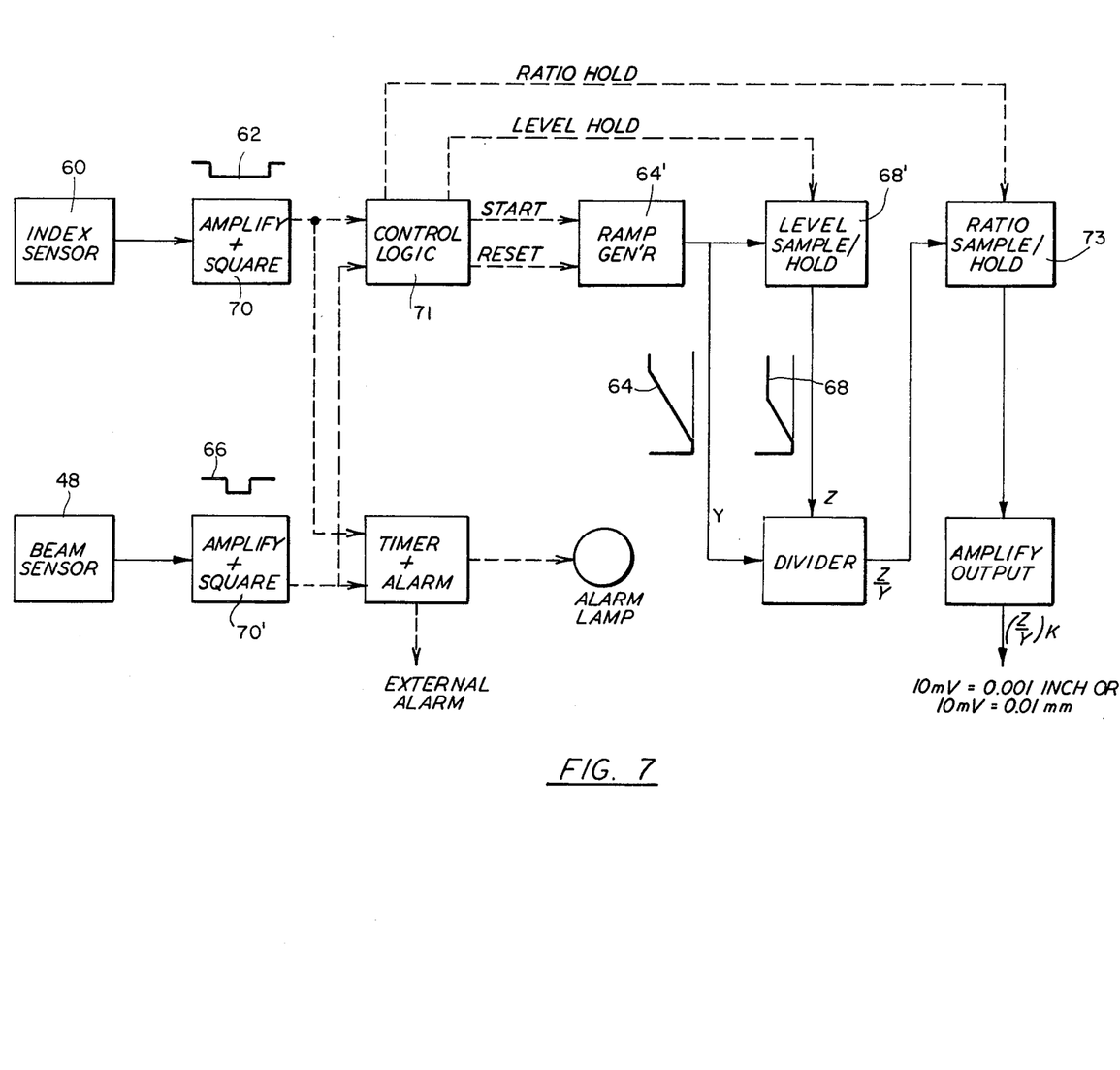
FIG. 7 is a block diagram of an electronics package suitable for implementing the measurement system of this embodiment.

A block diagram of suitable signal processing means for the functions just described is shown in FIG. 7. The signal processing electronics package may be located remotely from the optics and detector and is indicated in FIG. 1 by block 69. The signals generated by the index and beam sensors (photo-diode 60 and photo-detector 48, respectively) are each amplified and squared in corresponding circuits 70 and 70'. The resulting signals 62 and 66 are each applied to control logic circuit 71 which is responsive to the leading and trailing edges of index and beam signals 62 and 66, respectively.

Ramp (reference) signal 64 produced by ramp generator 64', is started and reset at the beginning and end, respectively, of each index signal 62 and the level signal 68 is held by sample/hold circuit 68' at the beginning of beam signal 66. The integrated values (Y and Z) of the reference and beam signals respectively are divided to provide a ratio (Z/Y) which is stored in ratio sample/hold circuit 73 and, after amplification, an output signal (Z/Y) k, which is directly commensurate with the dimension (level) being measured, is produced. The index and beam signals 62 and 66 are also applied to appropriate timer and alarm circuitry which monitors the presence or absence of the signals and provides an alarm indicating a system malfunction, misalignment, etc. if no index and/or beam signal is sensed after a predetermined number (e.g., 15) of cycles.

Figure 8:
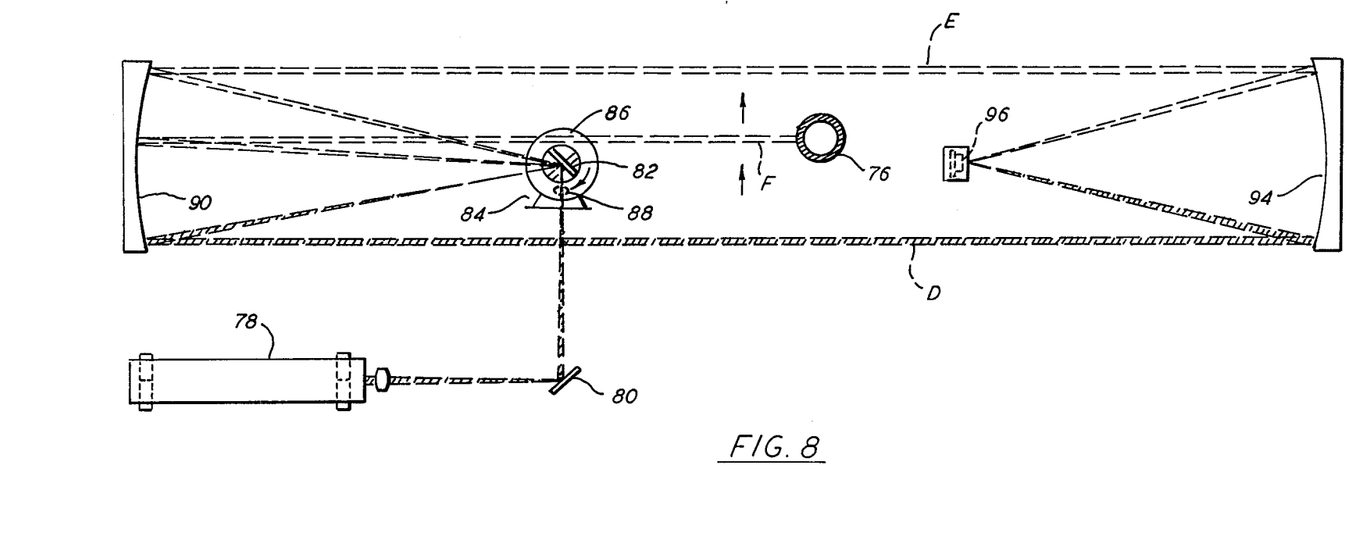
FIG. 8 is a perspective view showing the general external appearance of a second embodiment of the invention.
Figure 9:
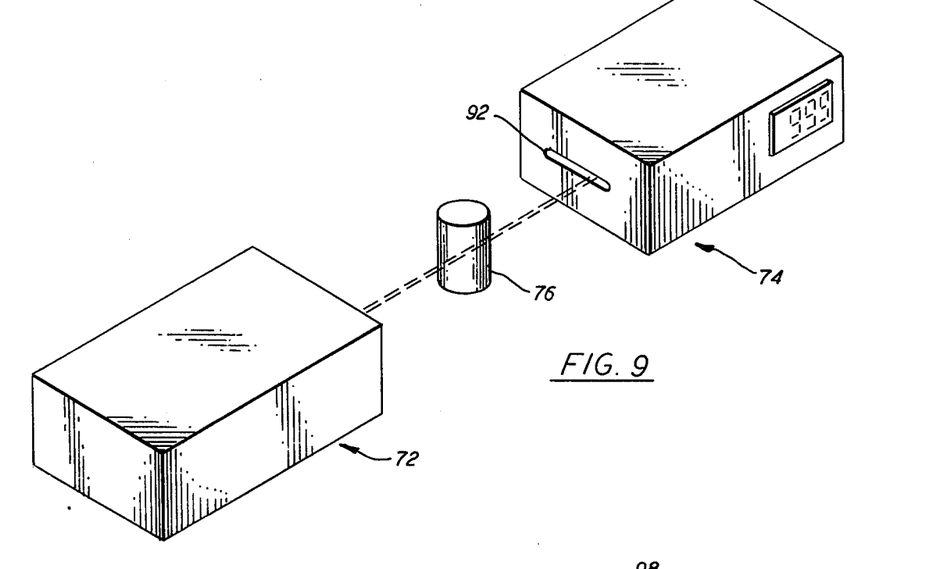
FIG. 9 is a somewhat diagramic plan view illustrating the operation of the second embodiment of the invention.
Figure 10:
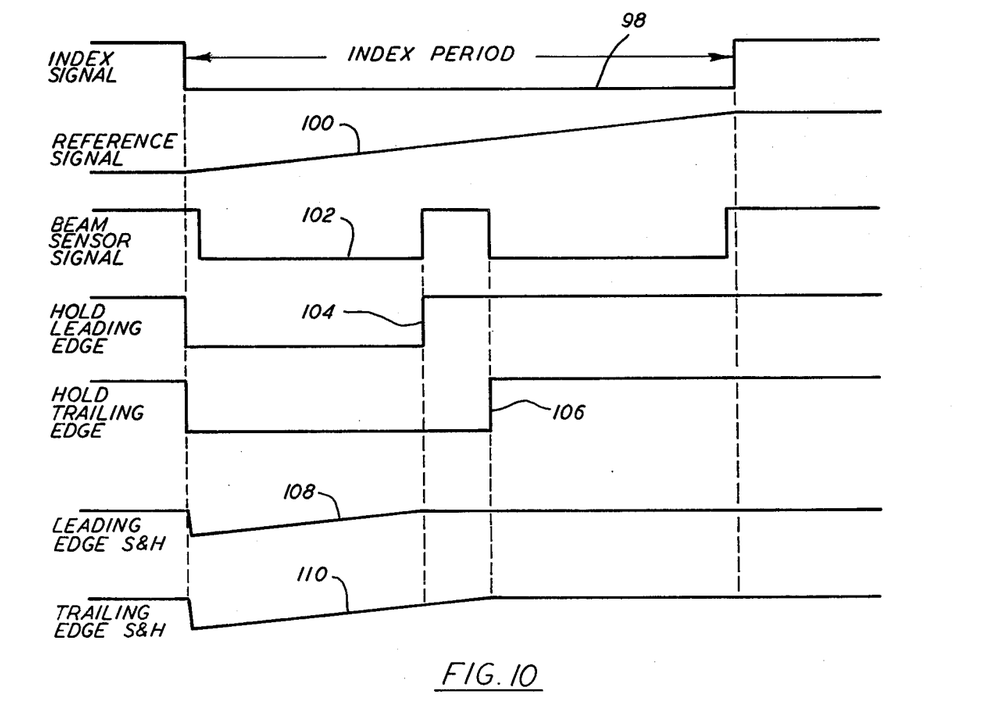
FIG. 10 is a timing diagram of the electrical signals generated and processed to provide the measurements in the embodiment of FIGS. 8 and 9.

In FIGS. 8-10 the invention is shown in an embodiment wherein the beam is occluded rather than reflected by the workpiece. This embodiment is illustrated as employed to measure the outside diameter of cylindrical objects, but may be used to measure the distance between any two points or an object between or on opposite sides of which the measuring beam is occluded by the object, or to measure the distance from a reference position to a single point on the object, e.g., an edge position. The beam source, again preferably a laser, and beam scanning optics are enclosed within a first housing 72, while the beam dector and associated electronics package are enclosed in second housing 74. Object 76 is positioned between housings 72 and 74.

As seen in the plan view of FIG. 8, the beam from laser 78 is directed upon a fixed, first surface mirror 80 by which it is reflected to plane mirror 82. Mirror 82 is carried on the shaft of synchronous electric motor 84, as is opaque disc 86 having opening 88 therein. Operation of the disc in conjunction with a light source and photo diode to establish an index period in each revolution of motor 84 may be identical to that of the previously described embodiment and is therefore not shown again in detail. The axis of rotation of mirror 82 intersects the central axis of fixed parabolic mirror 90 at the latter's focal point, upon which the beam reflected by mirror 80 is directed. As mirror 82 rotates, the beam is scanned diametrically across parabolic mirror 90 and reflected thereby through an elongated opening (not shown) in housing 72 and a corresponding opening 92 in housing 74. Since mirror 82 is at the focal point of mirror 90, the beam reflected by the latter always remains parallel to the central axis.

A second, fixed, parabolic mirror 94 is positioned in housing 74 in facing relation to mirror 90 and on a common central axis. Thus, as the beam is scanned across mirror 90 it is likewise scanned across mirror 94, from position D to position E. Photo-detector 96 is positioned in facing relation to mirror 94 on the central axis and at the focal point thereof. Therefore, the beam which is scanned across mirror 94 in a path parallel to its central axis is focused upon photo-detector 96, except for that portion of the scan where the beam is occluded by object 76, as when the beam is in position F.

A timing diagram of the signals generated in the measurement system of FIGS. 8 and 9 is given in FIG. 10. Index signal 98 goes from high to low during the time light passes through opening 88 to establish an index period, just as in the previously described embodiment. Reference signal 100 is generated as a ramp voltage during the index period, also as before. After the index period begins, the laser beam begins scanning across mirrors 90 and 94 to impinge upon photo-detector 96 and change the beam signal 102 from high to low. During the portion of the scan that the beam is occluded by object 76, signal 102 again goes high to produce another square wave with leading and trailing edges represented by traces 104 and 106, respectively. These signals are used to sample the values of the reference signal (or the integrated value thereof from the beginning of the index period) at the corresponding times. The (integrated) value of signal 100 is sampled at the end of each index period and the three values are read, corresponding to the values of signals 108 and 110 at the times sampled. Signal 108 is subtracted from signal 110 and the difference is ratioed with signal 100 to provide an output directly commensurate with the dimension being measured. If the position of only one point on the workpiece is to be measured relative to a reference point, the workpiece is positioned to extend into the path of the beam between mirrors 90 and 94. The beam impinges upon photo-detector 96 from the beginning of the index period until it strikes the workpiece and will be occluded for the remainder of the index period. In this event, signal 102 will have no trailing edge, whereby signal 110 will equal signal 100. Operation of the device, however, remains the same and signal processing electronics for implementing the functions of signals 98-110 are analogous to those of FIG. 7.

Although the illustrated embodiments both employ parabolic mirrors wherein the focal point lies on the central axis, the invention also contemplates construction wherein the focal point of the parabolic mirror(s) is not on the central axis.

What is claimed is:

1. An optical measuring system for measuring a dimensional parameter of a workpiece lying in the path of a beam of light, comprising:
  (a) at least one fixed, parabolic mirror;
  (b) a rotatably mounted plane mirror for reflecting a beam of light directed upon a predetermined portion thereof in a circular path, said predetermined portion of said plane mirror being at the focal point of said parabolic mirror;
  (c) means for directing a beam of light along a predetermined path which includes both the workpiece and said predetermined portion of said plane mirror;
  (d) light-responsive means for generating electrical signals in response to said beam of light impinging thereon, said parabolic and plane mirrors and said predetermined path of said beam being so related that variations in a dimensional parameter of a workpiece produce corresponding variations in said electrical signals; and
  (e) signal processing means adapted to electronically relate said electrical signal to the dimensional parameter to provide a measurement thereof, said signal processing means including ramp generating means producing a reference signal, and ramp level sampling means responsive to said electrical signal to sample said reference signal in accordance with the dimensional parameter being measured.

2. The invention according to claim 1, further including a workpiece comprising a flowable material having a dimensional parameter which is the distance bewtween the plane of the material surface and a reference plane, said material surface of said workpiece lying in said predetermined path of said beam.

3. The invention according to claim 2, wherein said beam is directed upon said material surface of said workpiece and reflected thereby along an axis which is displaced in accordance with variations in said dimensional parameter.

4. The invention according to claim 1, further including second light-responsive means for generating an electrical index signal at a fixed rotational position of said plane mirror, said index signal resetting and then starting said ramp signal at each rotation of said plane mirror.

5. The invention according to claim 1, further including first and second housings and a second parabolic mirror, said first housing containing said means for directing said beam, said plane mirror, and said at least one parabolic mirror, and said second housing containing said second parabolic mirror and said photosensitive means, said second parabolic mirror lying in said predetermined path to direct said beam to said photosensitive means, said first and second housings being spaced apart to accommodate a workpiece in the path of said beam between said first and second housings.

6. The invention according to claim 1 further including a workpiece comprising a process liquid wherein the dimensional parameter to be measured is the surface level thereof.

7. The invention according to claim 6 wherein said process liquid is molten glass.

8. The invention according to claim 1 wherein said beam of light is directed at a predetermined angle upon a workpiece and is reflected thereby to said parabolic mirror, the position at which said beam strikes said parabolic mirror varying along a radial line thereon as a dimensional parameter of the workpiece varies.

9. The invention according to claim 1 including two facing, coaxial parabolic mirrors between which at least a portion of a workpiece can be positioned.

10. The invention according to claim 9 wherein said predetermined portion of said plane mirror is at the focal point of a first and said light-responsive means at the focal point of a second of said two parabolic mirrors.

11. The invention according to claim 10, further including a workpiece having at least a cylindrical portion positioned between said first and second parabolic mirrors, wherein the dimensional parameter to be measured is the outside diameter thereof.

12. The invention according to claim 9 wherein said beam of light is directed upon said plane mirror and scanned by the rotation thereof diametrically across a first of said parabolic mirrors, and reflected from the latter to a second of said parabolic mirrors, the path of said beam of light being occluded by a workpiece during a portion of its travel between said first and second parabolic mirrors.

13. The invention according to claim 1 and further including a motor which carries and rotates said plane mirror wherein said signal processing means includes means for electrically establishing a fixed point in each revolution of said motor.

14. The invention according to claim 13 and further including index means carried and rotated by said motor together with said plane mirror, said index means cooperating with adjacent, fixed signal generating means to electrically establish said fixed point in each revolution of said motor.

15. An optical measuring system for measuring the surface level of a liquid, comprising:

a first housing;
a fixed parabolic mirror in said housing;
a plane mirror rotatably mounted in said first housing for reflecting a beam of light in a circular path, said plane mirror having its axis of rotation at the focal point of said parabolic mirror;
a second housing;
a source of light mounted in said second housing;
means for directing a beam of light from said source along a predetermined path which includes the surface of the liquid to be measured;
means for mounting said first housing to position said fixed parabolic mirror in the path of said beam of light from said source after it is reflected from the surface of the liquid to be measured;
a plane mirror rotatably mounted in said first housing and having its axis of rotation at the focal point of said fixed parabolic mirror, whereby said beam of light after reflection from the liquid surface is focussed on said plane mirror by said parabolic mirror;
means for rotating said plane mirror to cause said plane mirror to reflect said beam of light along a circular path;
light-responsive means fixedly positioned on said circular path for receiving said beam of light from said rotating mirror and generating an electrical signal in response thereto, said parabolic and plane mirrors and said predetermined path of said beam being so related that variations in the level of the surface of the liquid to be measured cause said light beam to be reflected onto said light-responsive means at varying angular positions of said rotating plane mirror;
index means for said rotating plane mirror for producing an index signal at a fixed angular position of said plane mirror for each revolution thereof; and
signal processing means relating said electrical signals to the liquid level to provide a measurement thereof, said signal processing means including ramp generating means responsive to said index signal for initiating a varying reference signal, and ramp level sampling means responsive to said electrical signal to sample said reference signal, said sampling occurring at a time interval after the initiation of said reference signal that is dependent on the angle of rotation of said rotating plane mirror, and thus is dependent on the liquid level, whereby the amplitude of the reference sample indicates the liquid level.

16. The optical measuring system of claim 15, wherein said index means comprises a disc rotating with said plane mirror, a slot in said disc, and photosensitive means responsive to the passage of said slot to produce said index signal.

17. The optical measuring system of claim 16, wherein the leading edge of said index signal initiates said reference signal and the trailing edge of said index signal terminates said reference signal, said reference signal being a ramp voltage which increases at a constant rate.

18. The optical measuring system of claim 17, wherein said electrical signal produced by said light responsive means comprises a pulse which occurs during said reference signal when the rotational position of said plane mirror causes said beam to impinge on said light responsive means, the rotational position of said mirror at the occurrence of said pulse being dependent on the liquid level.

19. The optical measuring system of claim 18, wherein said ramp level sensing means includes a sample and hold circuit responsive to said pulse to sample the level of said ramp voltage.

20. An optical measuring system for measuring a dimensional parameter of a workpiece lying in the path of and partially occluding a beam of light, comprising:
a first housing;
a first parabolic mirror fixedly mounted in said housing;
a plane mirror rotatably mounted in said first housing for reflecting a beam of light directed thereon in a predetermined path, said plane mirror having its axis of rotation at the focal point of said first parabolic mirror, whereby said predetermined path includes said parabolic mirror;
means for rotating said plane mirror;
a source of light;
means directing a beam of light from said source onto said plane mirror for reflecting onto said parabolic mirror, rotation of said plane mirror causing said beam of light to scan across said parabolic mirror and across a predetermined path parallel to the axis thereof;
a second housing spaced from said first housing and lying in said predetermined path, the space between said first and second housings being adapted to receive a workpiece having a dimensional parameter to be measured, whereby the workpiece will occlude a portion of said predetermined path;
a second parabolic mirror mounted in said second housing in said predetermined path and being axially aligned with said first parabolic mirror, said second parabolic mirror being adapted to receive light reflected from said first parabolic mirror;
light-responsive means positioned at the focal point of said second parabolic mirror for receiving said light received by said second parabolic mirror and for generating electrical signals in response thereto, said electrical signals varying in accordance with the dimensional parameter of a workpiece occluding said predetermined path;
index means for said rotating plane mirror for producing an index signal at a fixed angular position of said plane mirror for each revolution thereof; and
signal processing means relating said electrical signals to said dimensional parameter to provide a measurement thereof, said signal processing means including ramp generating means responsive to said index signal for initiating a varying reference signal, and ramp level sampling means responsive to said electrical signals to sample said reference signal, said sampling occurring at time intervals after the initiation of said reference signal that are dependent on the angle of rotation of said rotating plane mirror, and thus dependent on the dimension of the workpiece occluding said predetermined path, whereby the amplitudes of the reference samples indicate the dimension of the workpiece.

21. The optical measuring system of claim 20, wherein said index means comprises a disc rotating with said plane mirror, a slot in said disc, and photosensitive means responsive to the passage of said slot to produce said index signal.

22. The optical measuring system of claim 21, wherein the leading edge of said index signal initiates said reference signal and the trailing edge of said index signal terminates said reference signal, said reference signal being a ramp voltage which increases at a constant rate.

23. The optical measuring system of claim 22, wherein said electrical signals produced by said light responsive means comprises a pulse which occurs during said reference signal and which begins when the rotational position of said plane mirror causes said beam to impinge on a workpiece and to be occluded thereby and which ends when the rotational position of said plane mirror advances to cause said beam to pass over the workpiece to terminate the occlusion, the length of the pulse, and thus the amplitudes of the reference signal at the beginning and end of the pulse being dependent on the dimension of the workpiece in said predetermined path.

* * * * *